United States Patent Office 2,731,382
Patented Jan. 17, 1956

2,731,382

PYRIMIDINE SUBSTITUTED UREA COMPLEXES AND PROCESSES FOR PREPARING THE SAME

Arthur J. Basso, Colonia, N. J., and Robert C. O'Neill, New York, N. Y., assignors to Merck & Co., Inc., Rahway, N. J., a corporation of New Jersey No Drawing. Application December 29, 1954, Serial No. 478,514

20 Claims. (Cl. 167—53.1)

This invention relates to novel pyrimidine-substituted urea complexes and to the processes for preparing these novel compounds.

This application is a continuation-in-part of patent application Serial No. 399,152, filed December 18, 1953, now abandoned.

It has been found that these pyrimidine-substituted urea complexes possess marked and effective action in the control and treatment of the disease coccidiosis which infects poultry.

The novel pyrimidine-substituted urea complexes with which this invention is concerned may be represented by the following structural formula:

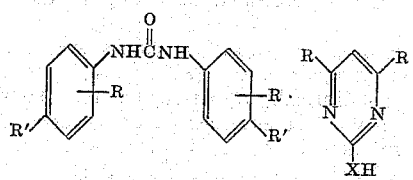

wherein R is hydrogen or a lower alkyl group, R' is an electron withdrawing group and X is oxygen or sulfur.

These pyrimidine-substituted urea complexes are new chemical compounds. They are equimolar complexes which have their own characteristic properties that are markedly different from the component parts and are not mere mixtures of a pyrimidine and a substituted urea.

These novel pyrimidine-substituted urea complexes are produced by reacting a substituted urea compound represented by the formula—

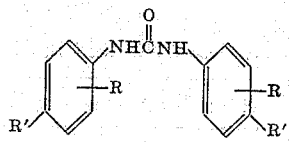

wherein R is hydrogen or a lower alkyl group and R' is an electron withdrawing group, with a pyrimidine compound represented by the formula—

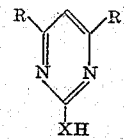

wherein R is as above and X is oxygen or sulfur.

The substituted urea compounds which may be employed as one of the starting materials in this process are carbanilide compounds having an electron withdrawing member in the 4 and 4'-positions of the rings. Examples of electron withdrawing groups which may be used are nitro, cyano, carboxy, carboalkoxy, acetyl, trimethyl ammonium, sulfonic acid, sulfonamide, and carbamide groups. Such groups are alternatively referred to as meta directing (see Fieser and Fieser, "Organic Chemistry," 2nd edition, 1950, p. 595). Specific carbanilide compounds which may be employed include 4,4'-dinitrocarbanilide; 2-methyl-4,4'-dinitrocarbanilide; 4-nitro-4'-cyanocarbanilide; and 4-nitro-4'-acetocarbanilide.

Examples of pyrimidine compounds which may be employed in this invention include 2-hydroxy-4,6-dimethylpyrimidine; 2-hydroxypyrimidine; 2-mercapto-4,6-dimethylpyrimidine; 2-hydroxy-4-methylpyrimidine; and 2-hydroxy-4,6-diethylpyrimidine.

In accordance with one procedure for carrying out the process of this invention, the solid substituted urea compound is reacted with a solution of the pyrimidine compound. The reaction mixture in which the substituted urea compound is ordinarily insoluble or very slightly soluble is stirred until the insoluble complex is formed. The insoluble pyrimidine-substituted urea complex is then filtered, washed and dried.

The reaction solvent is not critical. Ethers such as dioxane and ethyl ether, alcohols such as the lower aliphatic alcohols, hydrocarbons such as benzene, toluene, water and mixtures of such solvents may be employed satisfactorily. It has been found advantageous to employ a solvent in which the pyrimidine is soluble and in which the substituted urea is insoluble.

As the substituted urea compound it is preferred to employ 4,4'-dinitrocarbanilide, although other carbanilides having different electron withdrawing groups in the 4 and 4'-positions may be used. Typical substituents which may be present in these positions are nitro, cyano, carboxyl, and carboalkoxyl radicals. Furthermore, the electron withdrawing groups at the 4 and 4'-positions need not be the same. Thus, typical examples of 4,4'-disubstituted carbanilides useful in this invention are 4,4'-dinitrocarbanilide; 4,4'-dicyanocarbanilide; and 4-nitro-4'-cyanocarbanilide.

The pyrimidine-substituted urea complexes prepared in accordance with this invention are active against the widespread poultry disease commonly called "coccidiosis" which is caused by species of protozoan parasites of the genus Eimeria. In this regard, E. tenella is responsible for a severe and frequently fatal infection of the caecum of chickens. Furthermore, other serious infections are caused in fowl by other species of Eimeria and especially E. acervulina, E. necatrix, E. maxima, and E. brunetti. If left untreated, such infections often cause extensive losses of fowl. The elimination or control of coccidiosis is, therefore, of the utmost importance for successful poultry raising.

According to a further embodiment of this invention, novel compositions useful in the treatment of coccidiosis are provided containing a pyrimidine-substituted urea complex as an active ingredient. These compositions comprise a pyrimidine-substituted urea complex intimately combined with an inert carrier. In this regard compositions which contain a compound of the formula—

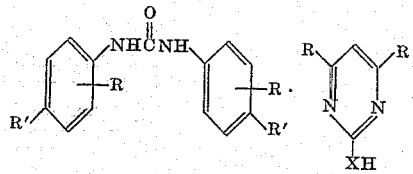

wherein R is hydrogen or a lower alkyl group, R' is an electron withdrawing group, and X is oxygen or sulfur, as the active ingredients have been found to be particularly useful against coccidiosis.

These compositions comprise at least one of the pyrimidine-substituted urea complexes mentioned above combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, Attapulgus clay, and edible vegetable materials such as commercial animal and poultry feeds, urea, corn meal, ground corn, citrus meal, fermentation residues and distillers' dried grains. The active ingredient is conveniently dispersed in a solid carrier by conventional methods such as stirring, tumbling, and grinding. In this manner, by selecting different carriers and by altering the ratio of carrier to active ingredient, compositions of varying concentration can be prepared. Compositions very suitable for addition to poultry feed may contain from about 5% to about 40% of the new coccidiostat, and preferably about 10–25%, adsorbed on or mixed with a carrier.

Premixes of 4,4'-dinitrocarbanilide·2-hydroxy-4,6-dimethylpyrimidine complex may be prepared as referred to above in a general manner. Two satisfactory formulations are described in detail below.

A. Ingredients:
    a. 4,4' - dinitrocarbanilide·2 - hydroxy - 4,6 - dimethylpyrimidine complex
    b. Corn distillers' dried grains
    c. Wheat shorts
    d. Dried vitamin $B_{12}$ fermentation solubles Composition.—Each pound of the mixture preparation contains 0.30 pound of coccidiostat drug. In order to prepare 1000 pounds of feed premix the following quantities are employed:

a. 300 pounds 4,4'-dinitrocarbanilide·2-hydroxy-4,6-dimethylpyrimidine complex
b. 175 pounds corn distillers' dried grains (through 30 mesh screen)
c. 455 pounds wheat shorts (30–80 mesh)
d. 70 pounds dried vitamin $B_{12}$ fermentation solubles (30–80 mesh)

The total amounts of wheat shorts and fermentation solids, and about 150 pounds of corn grains are mixed followed by the drug and the remainder of the corn grains. After mixing for about two hours the material is ready for packaging.

B. Ingredients:
    a. 4,4' - dinitrocarbanilide·2 - hydroxy - 4,6 - dimethylpyrimidine complex
    b. Corn distillers' dried grains
    c. Wheat shorts
    d. Dried vitamin $B_{12}$ fermentation solubles Composition.—Each pound of the mixture contains 0.25 pound of coccidiostat.

Preparation.—The following quantities are employed in order to make 995 pounds of product:

a. 250 pounds 4,4'-dinitrocarbanilide·2-hydroxy-4,6-dimethylpyrimidine complex
b. 188 pounds corn distillers' dried grains (through 30 mesh screen)
c. 487 pounds wheat shorts (30–80 mesh)
d. 70 pounds dried vitamin $B_{12}$ fermentation solubles (30–80 mesh)

The actual operating conditions are as in A.

Products such as the above are suitable for incorporation into poultry feedstuffs in order to obtain the desired dosage level of active drug.

The amount of active ingredient required for effective prophylactic control of coccidiosis is very low. With regard to poultry, good results have been obtained by the administration of a quantity of the active ingredient equal to about 0.005% to 0.05% of the food consumed. Optimum results are usually obtained by the daily administration of a quantity of active ingredient equal to about .0075% to about .025% of the food consumed. Such relatively small amounts may be conveniently incorporated in the normal ration prior to feeding the poultry. Larger concentrations of up to about 0.1% of the active ingredient may be employed if an outbreak of the disease is encountered.

The coccidiostatic activity of compositions containing various pyrimidine-substituted urea complexes was experimentally demonstrated according to the following test:

Groups of 10 two-week old chicks were fed a mash feed containing from 0.01% to 0.04% of the active ingredient uniformly dispersed therein. After existing on the diet for 24 hours, each chick was inoculated with 50,000 sporulated oocyst of E. tenella. In addition, groups of 10 chicks were also infected but fed a diet free of the active ingredient and used as positive controls. Still other groups were treated separately with the substituted urea compound and the pyrimidine compound and with physical mixtures of the substituted urea compound and the pyrimidine compound. The experiment was terminated after administering the respective diets for seven days after inoculation and the following results were obtained: The oocyst count (number of parasites of E. tenella remaining) was determined by sacrificing the birds and examining the infected organs microscopically.

TABLE I.—ANTICOCCIDIAL TESTING RESULTS

| Compound | Percent Compound In Diet | Percent Mortality | | Oocyst Count $\times 10^6$ | | Percent Weight Gain | |
|---|---|---|---|---|---|---|---|
| | | Treated | Untreated | Treated | Untreated | Treated | Untreated |
| 4-4'-dinitrocarbanilide | 0.1 | 0 | 40 | 20 | 34.17 | 60 | 45 |
| | 0.05 | 0 | 40 | 28 | 34 | 66 | 45 |
| | 0.025 | 20 | 40 | 29 | 34 | 54 | 45 |
| A physical mixture of 4,4'-dinitrocarbanilide and 2-hydroxy-4,6-dimethylpyrimidine | 0.07 0.03 | 0 | 27 | 14 | 16 | 60 | 31 |
| 4,4'-dinitrocarbanilide·2-hydroxy-4,6-dimethylpyrimidine complex (Compound of Example 1) | 0.04 | 0 | 20 | 0.1 | 16.7 | 53 | 39 |
| | 0.02 | 0 | 20 | 0.1 | 16.7 | 64 | 39 |
| | 0.015 | 0 | 20 | 0.1 | 16.7 | 70 | 39 |
| | 0.01 | 0 | 20 | 2.0 | 16.7 | 68 | 39 |
| 4,4'-dinitrocarbanilide·2-hydroxypyrimidine complex (Compound of Example 2) | 0.04 | 0 | 40 | 0.2 | 14.7 | 49 | 34 |
| 4,4'-dinitrocarbanilide·2-mercapto-4,6-dimethylpyrimidine complex (Compound of Example 3) | 0.04 | 0 | 20 | 0.1 | 16.7 | 66 | 39 |
| | 0.02 | 0 | 20 | 0.1 | 16.7 | 75 | 39 |

It will be noted from Table I that 4,4'-dinitrocarbanilide when administered separately does have activity but such activity does not approach that displayed by the complex. The complexing agents of themselves are inactive. It has also been shown that mere physical mixtures of 4,4'-dinitrocarbanilide and a complexing agent do not have anticoccidial activity any greater than is obtained with 4,4'-dinitrocarbanilide alone.

A second experiment to determine the effectiveness against coccidiosis of 4,4'-dinitrocarbanilide·2-hydroxy-4,6-dimethylpyrimidine complex under field conditions was carried out, as follows:

A group of 1000 chickens was used as the control while a second group of 600 chickens was treated by incorporation into the feed of 0.009% 4,4'-dinitrocarbanilide·2-hydroxy-4,6-dimethylpyrimidine complex. All of the birds were challenged by artificial exposure to coccidiosis at two weeks of age. The results when the birds had reached ten weeks of age appear in Table II.

TABLE II

| | Percent 4,4'-Dinitrocarbanilide·2-hydroxy-4,6-dimethylpyrimidine in Feed | |
|---|---|---|
| | 0.0% | 0.009% |
| Mortality due to coccidiosis (percent): | | |
| Caecal | 3.1 | 0.0 |
| Intestinal | 0.7 | 0.0 |
| Total | 3.8 | 0.0 |
| Mean body weight (lb.): Age, weeks— | | |
| 2 | 0.28 | 0.29 |
| 6 | 1.02 | 1.17 |
| 10 | 3.28 | 3.43 |
| Mean feed efficiency (lb. feed per lb. gain) | 3.22 | 2.94 |

A third experiment consisted of twenty pens of 800 chickens each divided as follows:

a. 4 pens received no medication and served as controls.
b. 4 pens received 0.015% 4,4'-dinitrocarbanilide·2-hydroxy-4,6-dimethylpyrimidine complex continuously in the feed.
c. As b plus 25 gm. of penicillin per ton of feed intermittently.
d. As b plus 100 gm. of streptomycin per ton of feed intermittently.
e. As b plus 25 gm. of penicillin and 75 gm. of streptomycin per ton of feed intermittently.

The birds were artificially infected with coccidiosis at two weeks of age. The mortality and morbidity due to coccidiosis in each pen at ten weeks of age is shown below (Table III).

TABLE III

| Group | Pen No. | Mortality (percent) | Morbidity (percent) |
|---|---|---|---|
| a | 1 | 3.25 | 25 |
| | 2 | 6.25 | 50 |
| | 3 | 6.0 | 33 |
| | 4 | 0.0 | 0 |
| | | ¹ 4.4 | ¹ 27 |
| b–e | 5–20 | 0.0 | 0.0 |

¹ Average.

In still a fourth experiment at a commercial poultry farm 3250 chickens were divided into three separate pens, two of which were treated with 4,4'-dinitrocarbanilide·2-hydroxy-4,6-dimethylpyrimidine complex in the feed. Naturally occurring coccidiosis was depended upon for the challenge. The division of the birds into pens and incidence of morbidity due to coccidiosis is shown in Table IV below.

TABLE IV

| Pen No. | No. Birds | Percent Drug | Intestinal Coccidiosis Morbidity (percent) |
|---|---|---|---|
| 1 | 1,250 | 0.0 | 25.6 |
| 2 | 1,100 | 0.015 | 0.0 |
| 3 | 900 | 0.01 | 0.0 |

The following examples are intended to be illustrative only and may be varied or modified without departing from the spirit and scope of this invention:

*Example 1*

4,4'-DINITROCARBANILIDE·2-HYDROXY-4,6-DIMETHYL-PYRIMIDINE COMPLEX

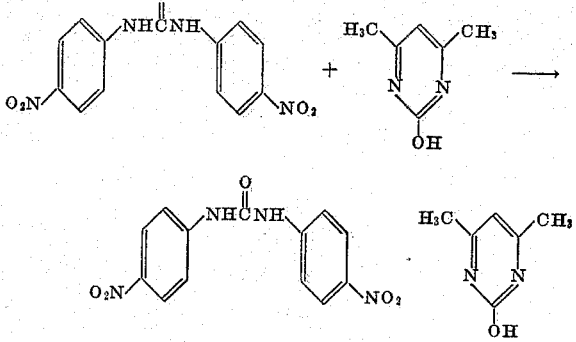

144 grams (0.90 mol) of 2-hydroxy-4,6-dimethylpyrimidine dihydrate were dissolved in a mixture of 1000 ml. of toluene and 560 ml. of ethanol at room temperature. The solution was stirred and 181.2 grams (0.60 mol) of 4,4'-dinitrocarbanilide was added.

The resulting slurry was stirred at room temperature for a total of ten and one-half hours, and then filtered with vacuum. The egg yoke-yellow 4,4'-dinitrocarbanilide·2-hydroxy-4,6-dimethylpyrimidine complex thus obtained was washed with ether, and air-dried to constant weight to yield 232 grams (91%) of said product. The 4,4'-dinitrocarbanilide·2-hydroxy-4,6-dimethylpyrimidine complex melted with decomposition at about 265° C. in a sealed capillary.

Purity and identity of 4,4'-dinitrocarbanilide·2-hydroxy-4,6-dimethylpyrimidine was established by ultraviolet assay of the components employing sulfuric acid as the solvent. Calculated 29.1%; found 29.2%. Analysis calculated for $C_{19}H_{18}N_6O_6$: C, 53.5; H, 4.26; N, 19.7. Found: C, 53.63; H, 4.30; N, 19.75.

A premix was prepared by blending 10% of 4,4'-dinitrocarbanilide·2-hydroxy-4,6-dimethylpyrimidine complex, 10% molasses solubles and 80% corn distillers' dry grain. The molasses solubles is not critical and mixtures of 10–20% of 4,4'-dinitrocarbanilide·2-hydroxy-4,6-dimethylpyrimidine complex and 80–90% corn distillers' dry grain would be satisfactory. Wheat shorts, whole ground corn or corn cob meal may be substituted for the corn distillers' dry grain. The amount of active ingredient may be varied to approximately 25% of the complete mixture.

Example 2
4,4'-DINITROCARBANILIDE·2-HYDROXYPYRIMIDINE COMPLEX

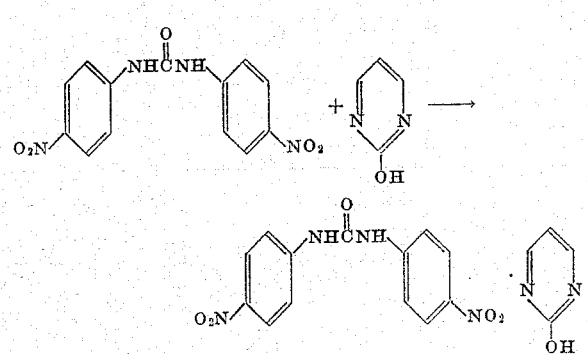

To a solution of 3.84 grams (0.04 mole) of 2-hydroxypyrimidine in 75 ml. of ethanol was added with stirring 9.06 g. (0.03 mole) of 4,4'-dinitrocarbanilide. The bright yellow slurry was stirred at room temperature for approximately 16 hours and filtered. The cake, consisting of finely divided 4,4'-dinitrocarbanilide·2-hydroxy-pyrimidine equimolar complex, was washed with ethyl acetate, then dried to constant weight to yield 10.6 g. (89%) of the desired product. Analysis calculated for $C_{17}H_{14}O_6N_6$: C, 51.2; H, 3.55; N, 21.1. Found: C, 50.9; H, 3.47; N, 21.28.

A premix may be prepared by blending 10% of the 4,4'-dinitrocarbanilide·2-hydroxy-pyrimidine complex and 90% corn distillers' dry grain.

Example 3
4,4'-DINITROCARBANILIDE·2-MERCAPTO-4,6-DIMETHYLPYRIMIDINE COMPLEX

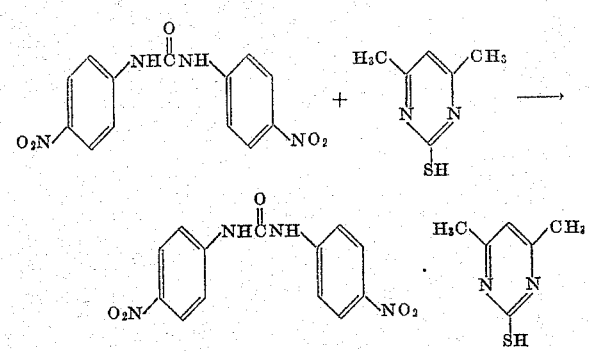

4.2 grams (0.03 mole) of 2-mercapto-4,6-dimethylpyrimidine was dissolved in 75 ml. of methanol and 10 ml. of water. To this solution was added 9.06 g. (0.03 mole) of 4,4'-dinitrocarbanilide at room temperature. The slurry was stirred for six hours, and the 4,4'-dinitrocarbanilide·2-mercapto-4,6-dimethylpyrimidine complex was collected by vacuum filtration, washed with methanol, ether, and dried to constant weight. There was obtained 12.0 g. (91%) of 4,4'-dinitrocarbanilide·2-mercapto-4,6-dimethylpyrimidine complex which melted with decomposition at about 240–247° C.

A premix may be prepared by blending 10% of 4,4'-dinitrocarbanilide·2 - mercapto - 4,6 - dimethylpyrimidine complex and 90% wheat shorts.

Example 4
2-METHYL-4,4'-DINITROCARBANILIDE·2-HYDROXY-4,6-DIMETHYLPYRIMIDINE COMPLEX

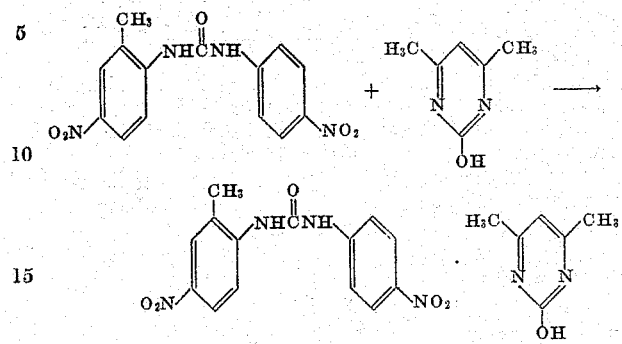

10 grams of 2-hydroxy-4,6-dimethylpyrimidine was dissolved in a minimum of ethanol. The mixture was stirred and 12.64 grams of 2-methyl-4,4'-dinitrocarbanilide was added. The slurry thus obtained was stirred for approximately 16 hours and filtered. The cake consisting of 2 - methyl - 4,4' - dinitrocarbanilide·2 - hydroxy - 4,6-dimethylpyrimidine complex was washed with ethyl acetate and then dried to constant weight to yield a product having a melting point of 210–215° C. (with decomposition).

The starting material 2-methyl-4,4'-dinitrocarbanilide was prepared, as follows:

30.0 grams (0.197 mol) of 2-methyl-4-nitroaniline and 31.9 grams (0.194 mol) of para-nitrophenylisocyanate was stirred with 500 ml. of toluene at reflux temperature for eight hours. The yellow crystalline product which formed gradually during this reaction was collected by vacuum filtration, washed with dry toluene, and dried to constant weight to yield 2-methyl-4,4'-dinitrocarbanilide having a melting point of 275–277° C. (with decomposition).

An analytical sample of 2-methyl-4,4'-dinitrocarbanilide was prepared by acetone recrystallization.

Analysis calculated for $C_{14}H_{12}O_5N_4$: C, 53.18; H, 3.82; N, 17.72. Found: C, 53.14; H, 3.52; N, 17.52.

A premix may be prepared by blending 10% of 2-methyl - 4,4' - dinitrocarbanilide·2 - hydroxy - 4,6 - dimethylpyrimidine complex and 90% corn cob meal.

Example 5
4-NITRO-4'-CYANOCARBANILIDE·2-HYDROXY-4,6-DIMETHYLPYRIMIDINE COMPLEX

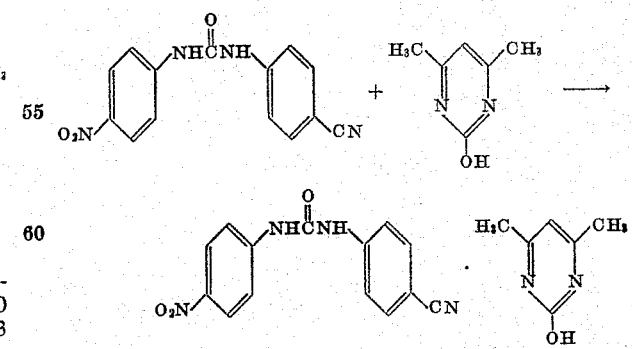

12 grams of 2-hydroxy-4,6-dimethylpyrimidine was dissolved in a minimum of ethanol and 14.1 grams of 4-nitro-4'-cyanocarbanilide was added. The reaction mixture was stirred at room temperature for approximately 16 hours and filtered. The cake consisting of finely divided 4 - nitro - 4' - cyanocarbanilide·2 - hydroxy - 4,6-dimethylpyrimidine complex, was washed with ethyl acetate, and then dried to constant weight to yield a product having a melting point of 244.5° C. (with decomposition).

The starting material 4-nitro-4'-cyanocarbanilide was prepared as follows:

24.6 grams (0.15 mol) of para-nitrophenylisocyanate was dissolved in 375 ml. of dry toluene and 17.7 grams (0.15 mol) of para-aminobenzonitrile was added. The mixture was stirred at reflux for three hours, cooled to room temperature and filtered. The filter cake of light yellow 4-nitro-4'-cyanocarbanilide was washed well with dry toluene and dried to constant weight to yield a product having a melting point of 295–298° C. (with decomposition).

An analytical sample of 4-nitro-4'-cyanocarbanilide was prepared by recrystallization from acetone. This product had a melting point of 298–300° C. (with decomposition).

Analysis calculated for $C_{14}H_{10}O_3N_4$: C, 59.61; H, 3.57; N, 19.86. Found: C, 59.49; H, 3.52; N, 19.69.

A premix may be prepared by blending 4-nitro-4'-cyanocarbanilide·2-hydroxy-4,6-dimethylpyrimidine complex and any of the carriers mentioned in Example 1.

*Example 6*

4-NITRO-4'-ACETOCARBANILIDE·2-HYDROXY-4,6-DIMETHYLPYRIMIDINE COMPLEX

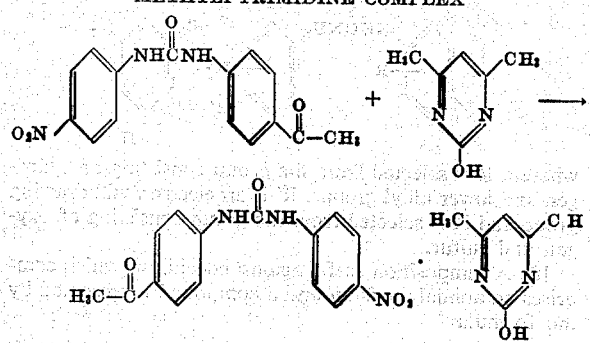

12.0 grams of 2-hydroxy-4,6-dimethylpyrimidine was dissolved in a minimum of ethanol and 14.9 grams of 4-nitro-4'-acetocarbanilide was added. The reaction mixture was stirred at room temperature for approximately 16 hours and filtered. The cake consisting of 4-nitro-4'-acetocarbanilide·2-hydroxy-4,6-dimethylpyrimidine complex was washed wth ethyl acetate, and then dried to constant weight to yield a product having a melting point of 213–216° C.

The starting material 4-nitro-4'-acetocarbanilide was prepared, as follows:

27 grams (0.2 mol) of dry para-aminoacetophenone was added to a clear solution of 31.3 grams (0.191 mol) of para-aminophenylisocyanate in 500 ml. of dry toluene, after one hour refluxing and stirring the mealy solid mass of crystalline 4-nitro-4'-acetocarbanilide was collected by vacuum filtration, washed with toluene and dried to constant weight. The 4-nitro-4'-acetonitrocarbanilide thus obtained had a melting point of 247–260° C. (with decomposition).

A premix may be prepared by blending 4-nitro-4'-acetocarbanilide·2-hydroxy-4,6-dimethylpyrimidine complex and any of the carriers mentioned in Example 1.

Various changes and modifications may be made in carrying out the present invention without departing from the spirit and scope thereof. Insofar as these changes and modifications are within the purview of the annexed claims, they are to be considered as part of this invention.

What is claimed is:

1. A compound of the formula—

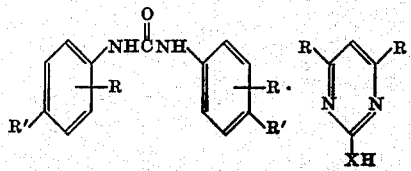

wherein R is selected from the group consisting of hydrogen and lower alkyl groups, R' is an electron withdrawing group, and X is selected from the group consisting of oxygen and sulfur.

2. A compound of the formula—

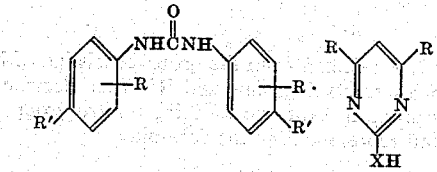

wherein R is selected from the group consisting of hydrogen and lower alkyl groups and R' is an electron withdrawing group, at least one R' being a nitro group, and X is selected from the group consisting of oxygen and sulfur.

3. A compound of the formula—

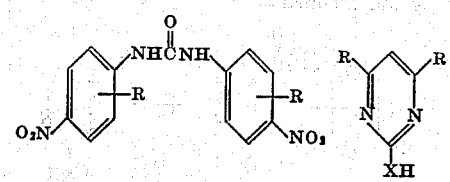

wherein R is selected from the group consisting of hydrogen and lower alkyl groups and X is selected from the group consisting of oxygen and sulfur.

4. 4,4' - dinitrocarbanilide·2 - hydroxy - 4,6 - dimethylpyrimidine complex.

5. 4,4' - dinitrocarbanilide·2 - hydroxypyrimidine complex.

6. 4,4' - dinitrocarbanilide·2 - mercapto - 4,6 - dimethylpyrimidine complex.

7. 2 - methyl - 4,4' - dinitrocarbanilide·2 - hydroxy - 4,6 - dimethylpyrimidine complex.

8. 4 - nitro - 4' - cyanocarbanilide·2 - hydroxy - 4,6 - dimethylpyrimidine complex.

9. The process which comprises reacting a compound represented by the formula—

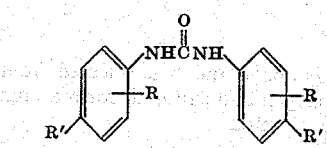

wherein R is selected from the group consisting of hydrogen and lower alkyl groups and R' is an electron withdrawing group with a compound represented by the formula—

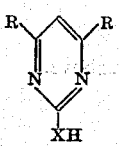

wherein R is as above and X is selected from the group consisting of oxygen and sulfur to form a complex represented by the formula—

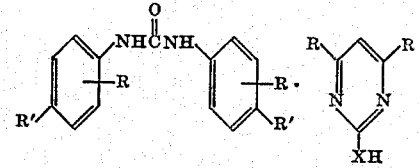

wherein R, R' and X are as above.

10. The process which comprises reacting a compound represented by the formula—

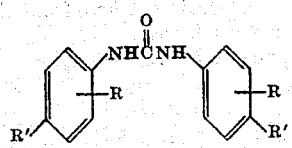

wherein R is selected from the group consisting of hydrogen and lower alkyl groups and R' is an electron withdrawing group at least one R' being a nitro group with a compound represented by the formula—

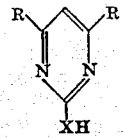

wherein R is as above and X is selected from the group consisting of oxygen and sulfur to form a complex represented by the formula—

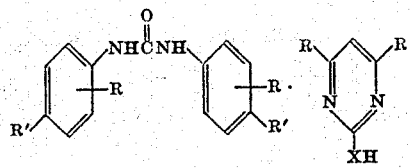

wherein R, R', and X are as above.

11. The process which comprises reacting a compound represented by the formula—

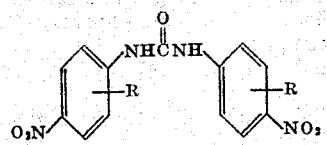

wherein R is selected from the group consisting of hydrogen and lower alkyl groups with a compound represented by the formula—

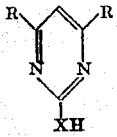

wherein R is as above and X is selected from the group consisting of oxygen and sulfur to form a complex represented by the formula

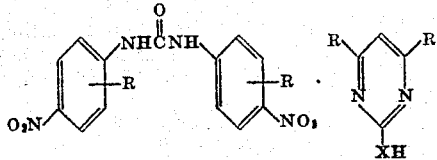

wherein R and X are as above.

12. The process which comprises reacting 4,4'-dinitrocarbanilide with 2-hydroxy-4,6-dimethylpyrimidine to form 4,4'-dinitrocarbanilide·2-hydroxy-4,6-dimethylpyrimidine complex.

13. The process which comprises reacting 4,4'-dinitrocarbanilide with 2-hydroxy-pyrimidine to form 4,4'-dinitrocarbanilide·2-hydroxypyrimidine complex.

14. The process which comprises reacting 4,4'-dinitrocarbanilide with 2-mercapto-4,6-dimethylpyrimidine to form 4,4'-dinitrocarbanilide·2-mercapto-4,6-dimethyl-pyrimidine complex.

15. The process which comprises reacting 2-methyl-4,4'-dinitrocarbanilide with 2-hydroxy-4,6-dimethylpyrimidine to form 2-methyl-4,4'-dinitrocarbanilide·2-hydroxy-4,6-dimethylpyrimidine complex.

16. The process which comprises reacting 4-nitro-4'-cyanocarbanilide with 2-hydroxy-4,6-dimethylpyrimidine to form 4-nitro-4'-cyanocarbanilide·2-hydroxy-4,6-dimethyl-pyrimidine complex.

17. A composition useful against coccidiosis which comprises an inert carrier and a compound represented by the formula

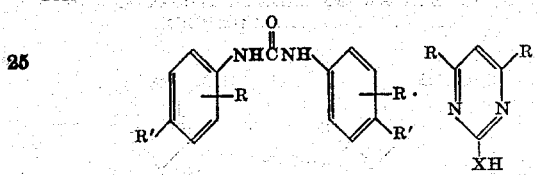

wherein R is selected from the group consisting of hydrogen and lower alkyl groups, R' is an electron withdrawing group and X is selected from the group consisting of oxygen and sulfur.

18. A composition useful against coccidiosis which comprises an animal feedstuff and a compound represented by the formula

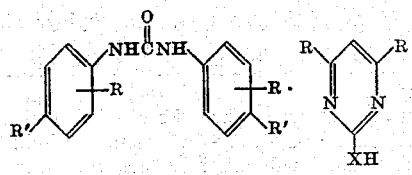

wherein R is selected from the group consisting of hydrogen and lower alkyl groups, R' is an electron withdrawing member and X is selected from the group consisting of oxygen and sulfur.

19. A composition useful against coccidiosis which comprises 4,4'-dinitrocarbanilide·2-hydroxy-4,6-dimethylpyrimidine complex, intimately dispersed in an inert carrier.

20. A composition useful against coccidiosis which comprises 4,4' - dinitrocarbanilide·2 - hydroxypyrimidine complex intimately dispersed in an inert carrier.

No references cited.